(12) United States Patent
Brand et al.

(10) Patent No.: US 11,103,815 B2
(45) Date of Patent: Aug. 31, 2021

(54) APPARATUS FOR FILTERING A LIQUID AND METHOD FOR DETECTING A STATE OF AT LEAST A FILTER ELEMENT

(71) Applicant: Robert Bosch GmbH, Stuttgart (DE)

(72) Inventors: Patric Brand, Sennfeld (DE); Adrien Mouaffo Tiadjio, Gerlingen (DE); Jochen Mueller, Backnang (DE); Peter Rehbein, Erlabrunn (DE); Peter Stachnik, Markgroeningen (DE); Sebastian Vornwald, Wuerzburg (DE); Thomas Inderwies, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/433,050

(22) Filed: Jun. 6, 2019

(65) Prior Publication Data
US 2019/0374884 A1 Dec. 12, 2019

(30) Foreign Application Priority Data
Jun. 6, 2018 (DE) ..................... 10 2018 208 880.2

(51) Int. Cl.
*B01D 35/143* (2006.01)
*B01D 46/42* (2006.01)
*F15B 21/041* (2019.01)
*B01D 39/00* (2006.01)

(52) U.S. Cl.
CPC ....... *B01D 35/1435* (2013.01); *B01D 46/429* (2013.01); *F15B 21/041* (2013.01); *B01D 39/00* (2013.01)

(58) Field of Classification Search
None
See application file for complete search history.

(56) References Cited

U.S. PATENT DOCUMENTS

| 2006/0060512 | A1* | 3/2006 | Astle | B01D 29/606 |
| | | | | 210/85 |
| 2013/0137110 | A1* | 5/2013 | Kraihanzel | B01L 3/5085 |
| | | | | 435/6.12 |
| 2018/0080916 | A1* | 3/2018 | Sanet | G01N 27/07 |

* cited by examiner

*Primary Examiner* — Richard C Gurtowski
(74) *Attorney, Agent, or Firm* — Maginot, Moore & Beck LLP

(57) ABSTRACT

An apparatus for filtering a liquid includes a filter housing, at least one filter element arranged in the filter housing, and at least one sensor unit. The at least one sensor unit includes at least one sensor and a radio module. The at least one sensor is configured to detect an operating parameter representative of a state of at least the at least one filter element or the apparatus.

9 Claims, 4 Drawing Sheets

APPARATUS FOR FILTERING A LIQUID AND METHOD FOR DETECTING A STATE OF AT LEAST A FILTER ELEMENT

This application claims priority under 35 U.S.C. § 119 to patent application no. DE 10 2018 208 880.2, filed on Jun. 6, 2018 in Germany, the disclosure of which is incorporated herein by reference in its entirety.

BACKGROUND

The disclosure relates to an apparatus for filtering a liquid, a method for detecting a state of at least a filter element or an apparatus for filtering a liquid, a computer program for a radio unit or a sensor unit and also a use of at least one sensor unit. The disclosure is in particular intended and suitable for use in connection with hydraulic oil filters.

The electrostatic charging of components is a known phenomenon that can also be encountered in everyday life. In hydraulics, the subject and the accompanying challenges are of increasing relevance. This is based on the fact that hydraulic liquids that have a reduced zinc and ash content are used increasingly in the industry. In comparison with conventional oils, the conductivity of the fluids is significantly lower as a result. Charge removal is reduced as a result, and there is the risk of damage to components, in particular of the filter element, as a result of discharges in the hydraulic system.

SUMMARY

It is an object of the disclosure to solve at least some of the problems outlined with reference to the prior art.

This is achieved by means of an apparatus for filtering a liquid, a method for detecting a state of at least a filter element or an apparatus for filtering a liquid, a computer program for a radio unit or a sensor unit and a use of at least one sensor unit according to the claims. The respective dependent claims specify preferred developments. Features presented in the claims can be (individually) combined with further features of other claims and/or of the description, unless explicitly ruled out in this case. The description, in particular in connection with the figures, specifies further alternatives and preferred variant embodiments.

The proposal in this case relates to an apparatus for filtering a liquid, comprising at least:
 a filter housing,
 at least one filter element arranged in the filter housing,
 at least one sensor unit having at least one sensor and a radio module,
wherein the sensor is configured and arranged such that it can detect an operating parameter representative of a state of at least the filter element or the apparatus.

The apparatus is designed in particular in the style of an (hydraulic) oil filter. The liquid is normally (hydraulic) oil. The filter housing is preferably metallic, in particular deep-drawn from metal. The filter element furthermore preferably comprises a nonwoven fabric and/or a (metal) textile, possibly held on a (metal) supporting structure.

The sensor unit can comprise for example a possibly watertight and/or gastight housing in which the sensor and the radio module are located. In this case, at least a part of the sensor and/or of the radio module can penetrate a housing wall outwards (possibly in watertight and/or gastight fashion). Preferably, however, all parts of the sensor and/or of the radio module are (completely) arranged (encapsulated) within an impermeable (sensor) housing. Apart from this, a microcontroller and/or an energy store of the sensor unit may be arranged in the housing. The (sensor) housing sits in particular on or against the filter housing.

The sensor unit has a radio module as an assembly that can be used to set up a radio connection in order to transmit for example sensor data to a radio unit. The radio module can comprise a radio antenna. In a preferred embodiment, at least one of the sensor units is in independent form. An independent sensor unit is intended to be understood in this case to mean a subassembly having at least one sensor, which subassembly can be operated without a cable connection.

The at least one sensor is configured and arranged such that it can detect or measure an operating parameter that is representative or characteristic of a state of at least the filter element or the apparatus. Such an operating parameter can be for example an acceleration, a magnetic flux density, a temperature, a light intensity and/or an audible signal.

A temperature monitoring function can be set up, so that e.g. it is possible to establish when something in the temperature response is wrong and/or an overheated state or supercooled state arises. Apart from this, temperature recording or logging of the temperature response can take place. A magnetic field monitoring function can be set up, so that e.g. it is possible to establish when something in the electromagnetic environment is wrong and/or an electromagnetic pulse or the like arises that can describe or characterize a state of charge. It is further possible for a light monitoring function to be set up, so that e.g. it is possible to establish when something is wrong with the light transmittance of the liquid and/or a turbid state arises. The turbidity of oil can be used as an indicator of the oil quality or the quality state of oil and in particular can be detected using a light sensor. In this context, a soiled state and/or decomposed state can also be detected using the light sensor.

Particularly preferably, a sound monitoring function is set up, so that e.g. it is possible to establish when something in the operating sound of the apparatus is wrong and/or an electrostatic discharge state arises. It has been found that electrostatic discharge states in a hydraulic system, in particular electrostatic discharges on filters, are clearly discernible as bangs audibly and/or through structure-borne sound. Apart from this, electrostatic discharge states of this kind also provide an indication that at least the filter element or the apparatus may be in a damaged state, in particular because applicable electrostatic discharges in hydraulic systems can regularly lead to damage to the filter element.

In this context, for example an acoustic sensor, such as for example a microphone, can be used to detect an audible signal (discharge bang) from the apparatus. Furthermore, in this context, an acceleration sensor can contribute to detecting a vibration and/or a structure-borne sound (caused by the electrostatic discharge) of the apparatus, in particular of the filter element and/or the filter housing.

Apart from this, at least one of the following (supplementary) functions may be set up:
 detecting a fracture in the filter attachment, for example by means of a rattling sound (audible signal) and/or an applicable vibration of the apparatus,
 detecting that the filter element needs to be replaced, for example by means of monitoring of the operating hours and/or the oil flow by means of the structure-borne sound,
 turbidity of the oil as an indicator of oil quality (degree of soiling, degree of decomposition, for example by means of light sensor),
 temperature tracking.

In a particularly advantageous configuration of the solution proposed in this case, structure-borne sound and/or a vibration is measured by means an acceleration sensor of the sensor unit. In this case, in particular a structure-borne sound and/or a vibration of the filter housing is measured. In this regard, it is particularly preferred if the acceleration sensor is firmly connected to the filter housing. The sensor configured and arranged in this manner can detect, in a particularly advantageous manner, an operating parameter, namely an acceleration, that is representative of a state, in particular an electrostatic discharge state or a damaged state, of at least the filter element or the apparatus.

According to one advantageous configuration, it is proposed that at least the sensor or the sensor unit is firmly connected to at least the filter housing or the filter element. Preferably, there is a material bond, in particular an adhesive bond or adhesive joint, between the sensor unit and the filter housing. The sensor may be firmly connected to the filter element via the sensor unit and/or the filter housing, for example. The particular effect that can be achieved by the firm connection is that a structure-borne sound and/or a vibration of the filter element and/or the filter housing is transmitted to the sensor.

The sensor unit can comprise at least one of the following sensors: acceleration sensor, magnetic field sensor, temperature sensor, light sensor and/or microphone. These sensors can determine at least one of the following operating parameters (of the apparatus) at the position of the sensor unit: an acceleration, a magnetic flux density, a temperature, a light intensity, an audible signal. The acceleration can be measured in particular using an acceleration sensor, which detects an absolute value and/or a direction of the acceleration. The magnetic flux density can be measured in particular using a magnetic field sensor, which detects an absolute value and/or a direction of the magnetic flux density. The temperature can be measured in particular using a temperature sensor, the light intensity can be measured in particular using a light sensor and the audible signal can be measured in particular using a microphone, that is to say e.g. a sound transducer that converts airborne sound as alternating sound pressure oscillations into corresponding voltage changes as a microphone signal.

According to one advantageous configuration, it is proposed that the sensor is an acceleration sensor. The acceleration sensor can measure in particular an acceleration of the housing wall section of the filter housing on which the sensor unit is (firmly) mounted. The housing wall section can be caused to vibrate in particular by sound propagating in the filter housing (what is known as structure-borne sound) and/or a vibration of the filter housing, and can thus be accelerated in particular in and contrary to a direction orthogonal to a two-dimensional expansion of the housing wall section.

According to one advantageous configuration, it is proposed that the sensor unit furthermore comprises a microcontroller and an energy store. The microcontroller may be configured to perform operation of the at least one sensor and/or of the radio module. It is also possible for the microcontroller to have a data memory (which is small in comparison with the radio unit and in terms of capacity) and/or an evaluation unit (which is less powerful in comparison with the radio unit and in terms of computation power) for sensor data.

In this context, it is particularly advantageous if the energy store comprises an NFC induction coil. This means, in other words, in particular that the energy store, in particular (only) of the sensor unit, can comprise an NFC induction coil. As such, it is possible to use "Near Field Communication" (NFC) to introduce energy into the sensor unit and/or to activate an energy store by means of NFC. The NFC induction coil can be coupled to the (mobile) radio unit for this purpose.

According to a further aspect, an installation is proposed, comprising at least an apparatus as proposed in this case and at least one radio unit. An installation is understood in this case to mean in particular a set comprising an apparatus, having a sensor unit, and a radio unit, wherein the sensor unit and the radio unit can set up a radio connection to one another, in particular based on BLE (Bluetooth Low Energy) or WiFi. The radio unit may be a standalone subassembly, which means that it can be embodied e.g. in the style of a communication node.

According to one advantageous configuration, it is proposed that the radio unit is configured to receive data of the sensor unit and to forward them to a data processing installation. The data can comprise the (latest or stored) data of the sensors. Reception can take place continuously, on request or at prescribable times, in particular when prompted by the sensor unit and/or the radio unit. The radio unit can (buffer-)store the received data and transfer them (directly or indirectly) to at least one data processing installation. In this regard, the data can be forwarded as received or in changed form. The data processing installation can be a server and/or part of what is known as a cloud. The data processing installation may be configured to store, process further, analyze and/or visualize the data obtained from the radio unit.

The at least one radio unit can comprise a computing unit configured to edit data received from the sensor unit at least in part. The computing unit has in particular a higher capacity and/or computation power than a microcontroller and/or an analysis unit of the sensor unit. The computing unit is in particular (by itself) configured such that it allows analysis of the sensor data. If need be, the computing unit may be configured to process or analyze the received sensor data.

The at least one radio unit can comprise an energy store in the style of a storage battery or a wired power supply. The (preferably rechargeable) storage battery preferably has a higher (electrical) capacity and/or (temporal) availability than an energy store possibly provided for the sensor unit. It is possible for the radio unit to be (periodically or permanently) supplied with electric power by cable.

According to one advantageous configuration, it is proposed that the radio unit comprises a smartphone or a gateway. A "smartphone" may be embodied with a complex operating system, so that there is the possibility of installing software or applications and the end user has an expandable and individualizable scope of functions. The "gateway" may be a network node (in particular as hardware), e.g. between the sensor unit and a data processing installation or a smartphone. The "gateway" may be an IoT gateway, by means of which IP can also be used to control devices that for their part communicate using predetermined radio protocols or proprietory databuses.

According to a further aspect, a method for detecting a state of at least a filter element or an apparatus for filtering a liquid is proposed, comprising at least the following steps:
a) activating at least one sensor unit having at least one sensor and a radio module,
b) detecting at least one operating parameter representative of a state of at least the filter element or the apparatus, c) transmitting the operating parameter from the sensor unit by means of the radio module to at least at least one radio unit or at least one data processing installation.

In step a), at least one sensor unit is activated. This sensor unit has at least one sensor and a radio module. The activating of the sensor unit and/or of the radio unit can be effected by the sensor unit, the radio module or a user. The activated state can be maintained intermittently, periodically or permanently.

In step b), at least one operating parameter representative of a state of at least the filter element or the apparatus is detected. Preferably, step b) involves an acceleration being measured by means of an acceleration sensor of the sensor unit. Alternatively or cumulatively, step b) preferably involves an audible signal being measured by means of a microphone of the sensor unit.

In step c), the operating parameter is transmitted from the sensor unit by means of the radio module to at least at least one radio unit or at least one data processing installation. The transmitting can be effected using known means of radio communication in this case, such as for example BLE. Preferably, the operating parameter is forwarded from the radio unit to the data processing installation. Alternatively, however, there may also be provision for the operating parameter to be transmitted directly to the data processing installation.

This can preferably be followed by at least the transmitted, possibly processed, operating parameter or a state identified on the basis of the operating parameter being sent. Sending can be effected from the radio unit to a (superordinate or central) data processing installation.

According to one advantageous configuration, it is proposed that step a) involves at least the radio module or the sensor unit being activated only when a measured value has been detected that exceeds a threshold value. Preferably, the radio module is activated only when the sensor of the sensor unit has been used to detect a measured value, for example an audible signal and/or an acceleration, that exceeds a (predefined, possibly constant) threshold value. More preferably, the sensor unit is activated only when a microphone of the radio unit has been used to detect a measured value, for example an audible signal, that exceeds a (predefined, possibly constant) threshold value. The threshold value is in particular dimensioned such that measured values above the threshold value provide an indication of the presence of an electrostatic discharge.

The sensor unit (e.g. in the style of an intelligent sensor node with Bluetooth radio, battery operated) can be operated on a "cyclic" basis (appropriately adjustable measurement periods), in an "on-event" mode and/or "on demand".

In an "on-event" mode, the sensor unit is (permanently) "on" or in what is known as the "half-asleep" economy mode, from which it is awoken by the microcontroller in the case of what is known as a shock event above a prescribable threshold value. Usually, shock is detected by means of acceleration values and/or acoustic values above the ambient stresses or ambient sounds. If for example a filter is located using a forklift truck, smaller signals/accelerations of the vibration sensor arise. If a threshold value for an electrostatic discharge has been defined, e.g. with an acceleration a greater than 1.5 g (g=acceleration due to gravity), then (only) this is detected and written to the memory, possibly with information about the level of the value and the time of day. At the same time, a BLE signal can be sent with the event (advertising mode).

What is known as "pairing" of the sensor unit can be requested (in scanning mode) "on demand". In this case, it is possible to read whether one or more shock events have taken place, i.e. the history can also be written by the sensor unit.

According to one advantageous configuration, it is proposed that step b) involves the operating parameter detected being at least a structure-borne sound or a vibration of at least the filter element or the apparatus. In this context, the detecting is effected in particular by means of an acceleration sensor. Preferably, the operating parameter detected is a structure-borne sound of at least the filter element or the filter housing.

According to one advantageous configuration, it is proposed that the state detected is the presence of an electrostatic discharge. In other words, this means in particular that the method is used for detecting an electrostatic discharge state of at least a filter element or an apparatus for filtering a liquid. An electrostatic discharge state is detected in particular when a value or response of the operating parameter is detected that is characteristic of said electrostatic discharge state.

According to one advantageous configuration, it is proposed that the state detected is the presence of possible damage to at least the filter element or the apparatus when a value or response of the operating parameter is detected that is characteristic of said damage.

Preferably, the sensor unit and/or the radio unit has/have patterns and/or criteria logged in it/them that allow a characteristic value or response of the operating parameter to be identified with the presence of an electrostatic discharge and/or possible damage to at least the filter element or the apparatus. Such a pattern can be for example a pattern of frequency peaks (in a frequency spectrum) and/or a pattern of amplitude swings (in an amplitude/time response). An applicable criterion may be the exceeding of a predefined (threshold) value, for example. An alternative or additional criterion may be a drop below a predefined distance between directly successive peaks (measured value swings), for example.

According to a further aspect, a computer program for a radio unit or a sensor unit is proposed that is configured for at least partially performing a method as described in this case. In other words, this relates in particular to a computer program (product) comprising commands that, when the program is executed by a computer, prompt said computer to perform at least parts of a method as described in this case. Preferably, a computer program for a radio unit is configured for performing at least step a) of the method and/or for sending at least the transmitted, possibly processed, operating parameter or a state detected on the basis of the operating parameter to a data processing installation. More preferably, a computer program for a sensor unit is configured for performing at least steps b) and c) of the method.

Apart from this, the aim in this case is to also present a machine-readable storage medium storing the computer program proposed in this case. Regularly, the machine-readable storage medium is a computer-readable storage medium.

According to a further aspect, a use of at least one sensor unit, which has at least one sensor and a radio module, for detecting at least one operating parameter representative of a state of at least a filter element or an apparatus for filtering a liquid is proposed.

The details, features and advantageous configurations discussed in connection with the apparatus can accordingly also arise for the installation presented in this case, the method, the computer program and/or the use, and vice versa. In this respect, reference is made to the full extent of the explanations therein for the purpose of more specific characterization of the features.

BRIEF DESCRIPTION OF THE DRAWINGS

The solution presented in this case and the technical sphere of said solution are explained more specifically below with reference to the figures. It should be pointed out that the disclosure is not intended to be restricted by the exemplary embodiments shown. In particular, unless explicitly depicted otherwise, it is also possible to extract partial aspects of the substantive matter explained in the figures and to combine said partial aspects with other elements and/or insights from other figures and/or the description. Schematically.

DETAILED DESCRIPTION

Figure 1:
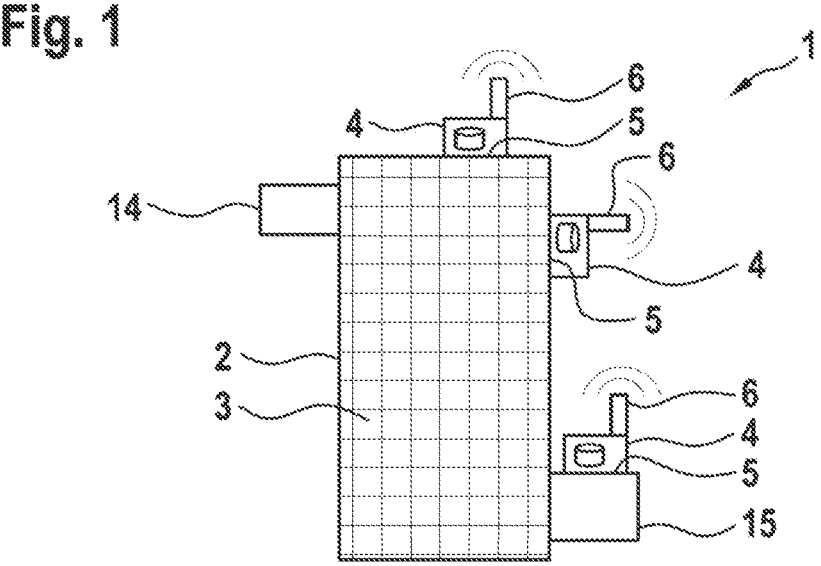
FIG. 1 shows an apparatus as proposed in this case.

FIG. 1 schematically shows an apparatus 1 as proposed in this case. The apparatus 1 is used for filtering a liquid. The liquid in this case is, in exemplary fashion, oil, which means that the apparatus 1 in this case is, in exemplary fashion, an oil filter.

The apparatus 1 comprises a filter housing 2 and a filter element 3 arranged in the filter housing 2. The filter element 3 in this case is, in exemplary fashion, a metallic filter textile configured to detain particles carried along by the liquid. The filter housing 2 in this case is metallic, for example, and has an inlet 14 and an outlet 15.

Also, the apparatus 1 in this case comprises, in exemplary fashion, three sensor units 4 that each have a sensor 5 and a radio module 6. Each of the sensors 5 is configured and arranged such that it can detect an operating parameter representative of a state of at least the filter element 3 or the apparatus 1.

According to the depiction shown in FIG. 1, the sensors 5 and the sensor units 4 are each firmly connected to the filter housing 2 and, via the latter, also to the filter element 3. Furthermore, the sensors 5 in this case are, in exemplary fashion, each in the form of an acceleration sensor.

The acceleration sensors firmly to the filter housing 2 and the filter element 3 can each be used to measure a structure-borne sound or a vibration of at least the filter element 3 or the apparatus 1. On the basis of the structure-borne sound detected in this manner or the vibration detected in this manner, it is possible to infer the presence of an electrostatic discharge of the filter housing 2 and/or the filter element 3.

Depending on the regularity and/or intensity of the electrostatic discharge(s), the filter housing 2 and/or the filter element 3 can be damaged thereby. Therefore, on the basis of the detected structure-borne sound or the detected vibration, it is also possible to infer the presence of possible damage to the filter element 3 and/or the apparatus 1.

Figure 2:
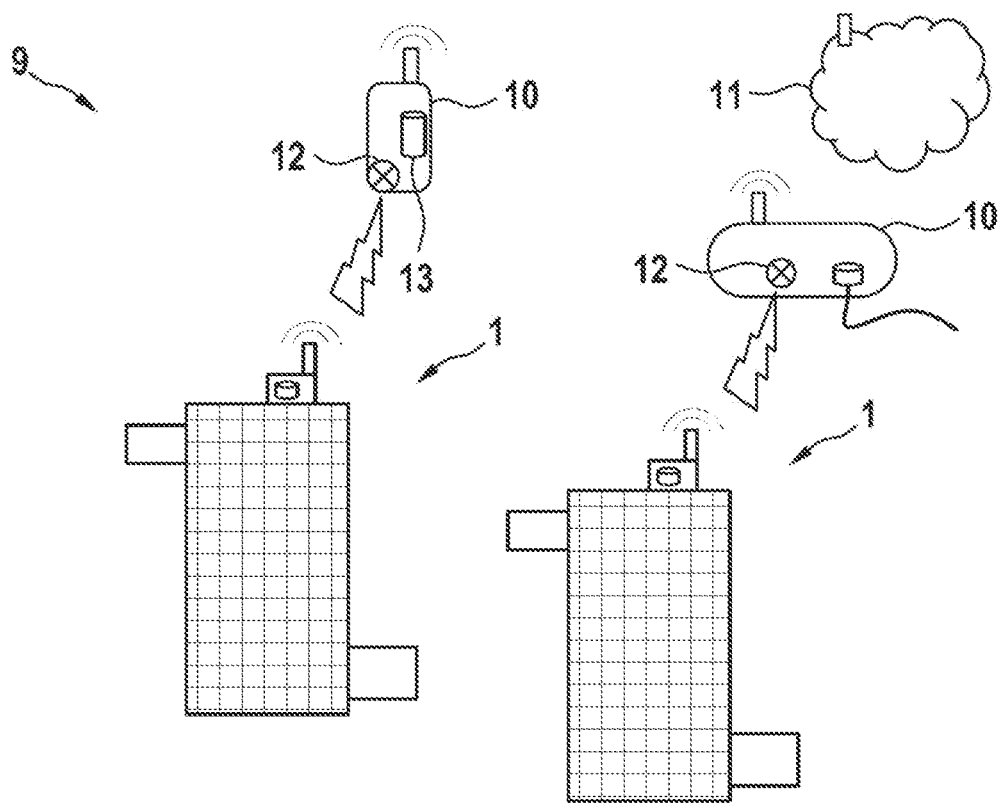
FIG. 2 shows an installation as proposed in this case.

FIG. 2 schematically shows an installation 9 as proposed in this case. The installation 9 in this case comprising, in exemplary fashion, two apparatuses 1 as proposed in this case and two radio units 10.

The radio units 10 are, in exemplary fashion, each configured to receive data of the sensor units 4 of the apparatuses 1 and to forward them to a data processing installation 11. The data processing installation 11 in this case is embodied in the style of what is known as a cloud. Apart from this, each radio unit 10 in this case has a computing unit 12 configured to process data received from the sensor unit 4 at least in part.

The radio unit 10 depicted on the left in FIG. 2 is designed in the style of a smartphone. This variant embodiment of a radio unit 10 designed as a smartphone further has an energy store 13 in the style of a storage battery.

The radio unit 10 depicted on the right in FIG. 2 is designed in the style of a gateway. This variant embodiment of a radio unit 10 designed as a gateway further has an energy store 13 in the style of a wired power supply.

Figure 3:
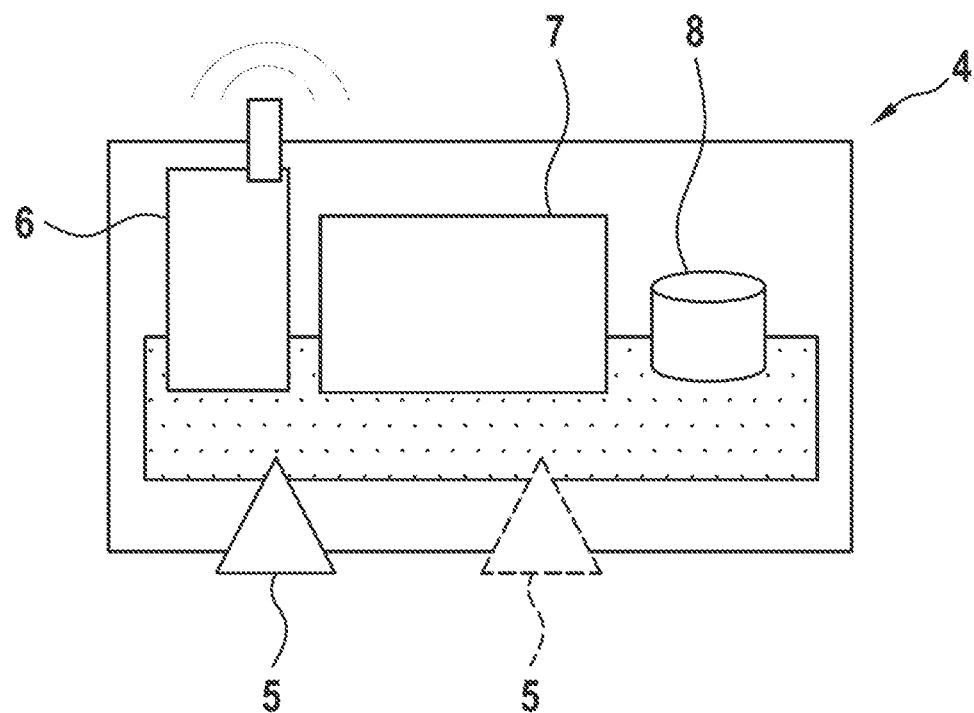
FIG. 3 shows a sensor unit that can be used in an apparatus as proposed in this case.

FIG. 3 schematically shows a sensor unit 4 that can be used in an apparatus as proposed in this case. The reference signs are used consistently, which means that reference can be made to the explanations pertaining to FIGS. 1 and 2.

The sensor unit 4 in this case comprises a radio module 6 and, in exemplary fashion, two sensors 5. One of these sensors 5 is, in exemplary fashion, an acceleration sensor and the other is a light sensor.

Apart from this, FIG. 3 illustrates that the sensor unit 4 can furthermore comprise a microcontroller 7 and an energy store 8. The energy store 8 can comprise an NFC induction coil (not depicted in this case), for example.

Figure 4:
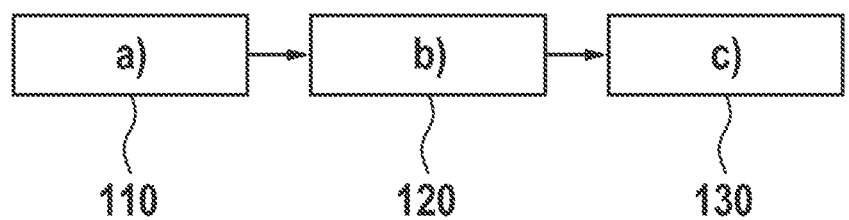
FIG. 4 shows a cycle of a method presented in this case in the case of a regular operating cycle.

FIG. 4 schematically shows a cycle of a method as presented in this case in the case of a regular operating cycle. The method is used for detecting a state of at least a filter element or an apparatus for filtering a liquid.

The depicted order of method steps a), b) and c) with blocks 110, 120 and 130 is merely exemplary. In block 110, at least one sensor unit having at least one sensor and a radio module is activated. In block 120, at least one operating parameter representative of a state of at least the filter element or the apparatus is detected. In block 130, the operating parameter is transmitted from the sensor unit by means of the radio module to at least at least one radio unit or at least one data processing installation.

Figure 5:
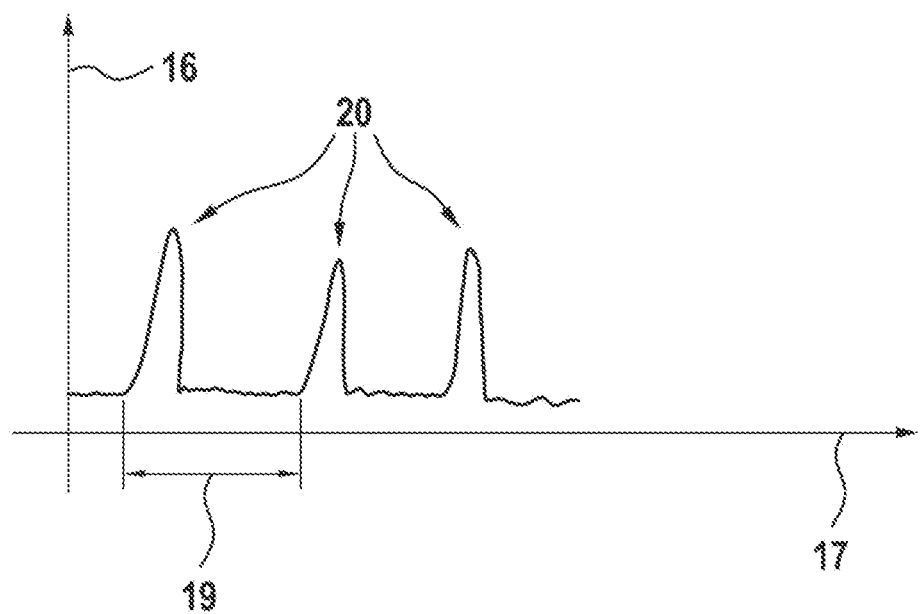
FIG. 5 shows an exemplary response of an operating parameter.

FIG. 5 schematically shows an exemplary response of an operating parameter. The operating parameter in this case is, in exemplary fashion, an acceleration 16. This acceleration 16 can be detected using an acceleration sensor of the sensor unit.

The acceleration 16 is plotted over time 17 according to the depiction shown in FIG. 5. The response in this case is distinguished by three peaks (swings) 20 that are successive after a comparatively short period duration 19. This response is an example of the response of the operating parameter that is characteristic of the presence of three electrostatic discharges. This response is, apart from this, an example of a response of the operating parameter that is characteristic of the presence of possible damage to at least the filter element or the apparatus.

Figure 6:
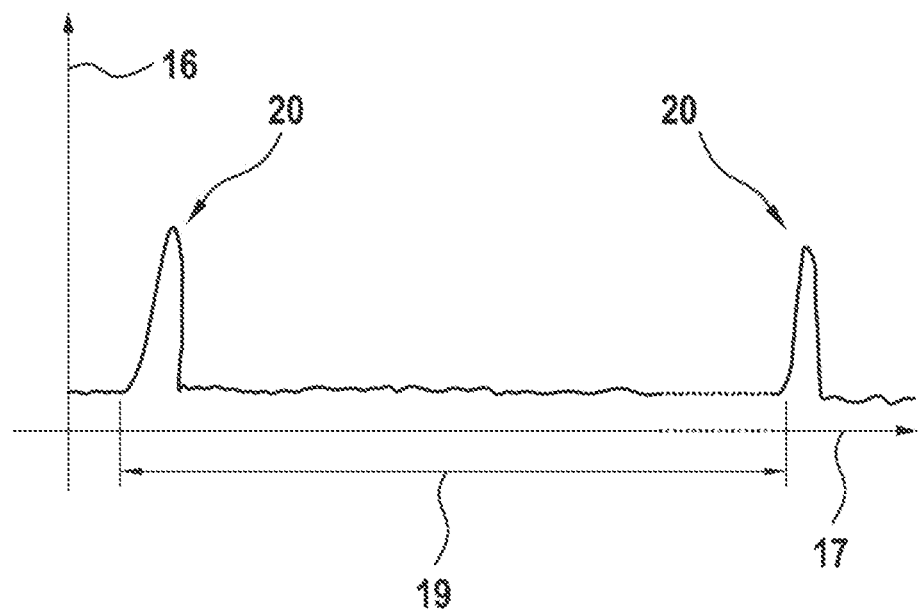
FIG. 6 shows a further exemplary response of an operating parameter.

FIG. 6 schematically shows a further exemplary response of an operating parameter. The operating parameter in this case too is, in exemplary fashion, an acceleration 16.

The acceleration 16 is also plotted over time 17 according to the depiction shown in FIG. 6. The response in this case is distinguished by two peaks (swings) 20 that are successive after a comparatively long period duration 19. This response is an example of a response of the operating parameter that is characteristic of the presence of two electrostatic discharges. Apart from this, this response is not an example of a response of the operating parameter that is characteristic of the presence of possible damage to at least the filter element or the apparatus, however.

Figure 7:
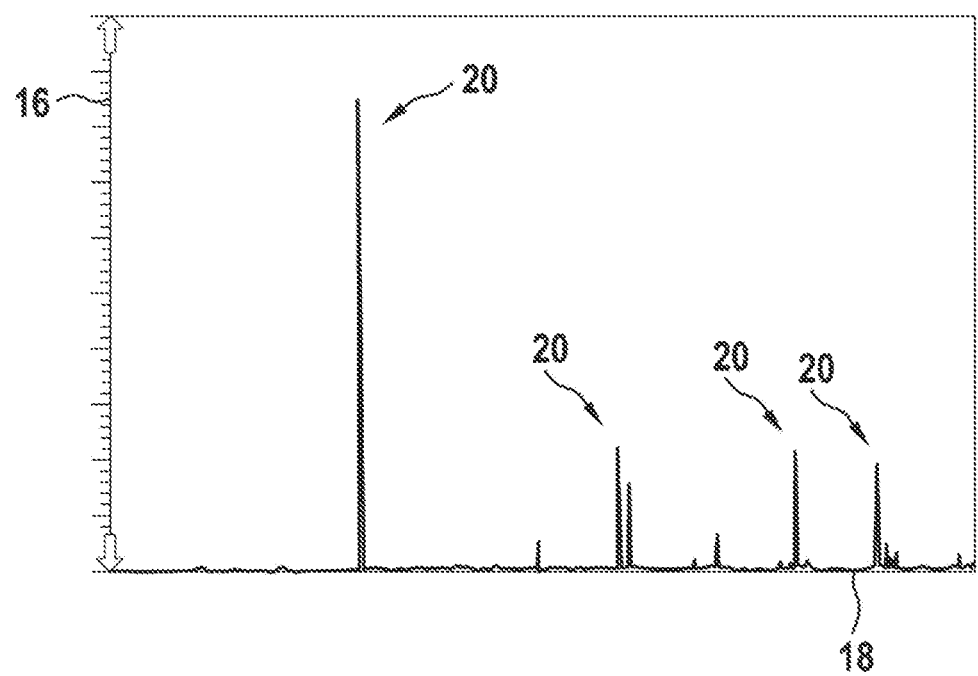
FIG. 7 shows an exemplary frequency spectrum.

FIG. 7 schematically shows an exemplary frequency spectrum. This has, in exemplary fashion, an acceleration 16 plotted, as an example of an operating parameter, over frequency 18.

The frequency spectrum in this case is distinguished by four peaks (swings) 20 that occur at different frequencies. It can be seen that the left-hand peak 20 has a comparatively high value. This value is an example of a value of the operating parameter that is characteristic of the presence of an electrostatic discharges. This value is, apart from this, an example of a value of the operating parameter that is characteristic of the presence of possible damage to at least the filter element or the apparatus.

LIST OF REFERENCE SIGNS

1 Apparatus
2 Filter housing
3 Filter element
4 Sensor unit
5 Sensor
6 Radio module
7 Microcontroller
8 Energy store
9 Installation
10 Radio unit
11 Data processing installation
12 Computing unit
13 Energy store
14 Filter inlet
15 Filter outlet
16 Acceleration
17 Time
18 Frequency
19 Period duration
20 Peak

What is claimed is:

1. An apparatus for filtering a liquid, comprising:
a filter housing;
at least one filter element arranged in the filter housing; and
at least one sensor unit including at least one acceleration sensor and a radio module, the acceleration sensor configured to measure a vibration of at least one of (i) the filter housing and (ii) the at least one filter element representative of a state of at least the at least one filter element or the apparatus.

2. The apparatus according to claim 1, wherein at least the at least one sensor or the at least one sensor unit is firmly connected directly to at least the filter housing or the at least one filter element.

3. An installation, comprising:
at least one radio unit;
at least one apparatus configured to filter a liquid, the apparatus including:
a filter housing;
at least one filter element arranged in the filter housing; and
at least one sensor unit including at least one sensor and a radio module, the at least one sensor configured to detect at least one operating parameter representative of a state of the at least one apparatus, the at least one operating parameter including at least one of (i) a structure-borne sound of the at least one apparatus and (ii) a vibration of the at least one apparatus; and
a data processor configured to (i) receive sensor data including measured values of the operating parameter from the at least one sensor unit via the at least one radio unit, and (ii) detect an electrostatic discharge within the at least one apparatus based on the sensor data.

4. The installation according to claim 3, wherein the at least one radio unit is configured to receive the sensor data from the at least one sensor and forward the sensor data to the data processor.

5. The installation according to claim 3, wherein the at least one radio unit includes a smartphone or a gateway.

6. A method for detecting an electrostatic discharge within an apparatus for filtering a liquid, the method comprising:
activating at least one sensor unit, the at least one sensor unit including at least one sensor and a at least one radio module;
measuring at least one operating parameter representative of a state of the apparatus, the at least one operating parameter including at least one of (i) a structure-borne sound of the at least one apparatus and (ii) a vibration of the at least one apparatus;
transmitting sensor data including measured values of the at least one operating parameter from the at least one sensor unit with the radio module to a data processor; and
detecting, with the data processor, an electrostatic discharge within the apparatus based on the sensor data.

7. The method according to claim 6, further comprising:
activating at least the at least one radio module or the at least one sensor unit only when a measured value of the at least one operating parameter exceeds a threshold value.

8. The method according to claim 6, the detecting further comprising:
detecting the electrostatic discharge within the apparatus in response to at least one of the measured values being characteristic of electrostatic discharge within the apparatus.

9. The method according to claim 6, wherein a computer program for the at least one radio module or the at least one sensor unit is configured to at least partially perform the method.

* * * * *

UNITED STATES PATENT AND TRADEMARK OFFICE
CERTIFICATE OF CORRECTION

PATENT NO. : 11,103,815 B2  Page 1 of 1
APPLICATION NO. : 16/433050
DATED : August 31, 2021
INVENTOR(S) : Patric Brand It is certified that error appears in the above-identified patent and that said Letters Patent is hereby corrected as shown below:

In the Claims

In Claim 6, at Column 10, Lines 28-29: "and a at least one radio module" should read --and at least one radio module--.

Signed and Sealed this
First Day of March, 2022

Drew Hirshfeld
*Performing the Functions and Duties of the
Under Secretary of Commerce for Intellectual Property and
Director of the United States Patent and Trademark Office*